United States Patent
Metsälä

(10) Patent No.: US 6,317,278 B1
(45) Date of Patent: Nov. 13, 2001

(54) PRECISION-MECHANICAL TRANSVERSE POSITIONING DEVICE

(76) Inventor: Seppo J Metsälä, Nauharinne 8, Vantaa (FI), 01260

( * ) Notice: Subject to any disclaimer, the term of this patent is extended or adjusted under 35 U.S.C. 154(b) by 0 days.

(21) Appl. No.: 09/592,463

(22) Filed: Jun. 9, 2000

Related U.S. Application Data

(63) Continuation of application No. PCT/FI97/00787, filed on Jun. 17, 1996.

(30) Foreign Application Priority Data

Jun. 17, 1996 (FI) .......................................... 102224

(51) Int. Cl.[7] ....................................................... G02B 7/02
(52) U.S. Cl. ............................................ 359/813; 359/823
(58) Field of Search .................................. 359/822, 823, 359/819, 813; 248/664, 660

(56) References Cited

U.S. PATENT DOCUMENTS 5,930,057 * 7/1999 Sechrist ................................ 359/822
6,170,795 * 1/2001 Wayne ................................. 248/664
6,198,580 * 3/2001 Dallakian .............................. 359/822

* cited by examiner

*Primary Examiner*—Georgia Epps
*Assistant Examiner*—Gary O'Neill

(57) ABSTRACT

The invention relates to a precision-mechanical positioning device for positioning a second component (2) relative to a first component (1) in any of the directions perpendicular to a combined straight line (3, 53) between the components. The positioning device comprises: in the first component, a basic member (5) having a first planar sliding surface (7); in the second component, a support member (6) having a second planar sliding surface (8); the support member being connected to the basic member such that the sliding surfaces bear against one another, forming a pair of sliding surfaces; the support member has holes (9) transverse to the plane of the pair of sliding surfaces, through which a locking device (4) extends to the basic member, the shanks (10) of the locking members having a thickness (D2) smaller than the hole diameters (D1); and clamping device (11) for pressing the support member into immobile contact with the basic member after the positioning has been completed. A layer of fatty lubricant (S1) has been provided between, the first sliding surface (7) and the second sliding surface (8), the layer generating a first friction (U1) between these sliding surfaces, and a bushing (20) and/or washers (22) being provided between the clamping device and the support member to generate a second friction (U2) between the clamping device and the support member. The first friction (U1) is substantially higher than the second friction (U2) in order to prevent the support member (6) from shifting relative to the basic member (5).

14 Claims, 3 Drawing Sheets

PRECISION-MECHANICAL TRANSVERSE POSITIONING DEVICE

This application is a continuation of PCT/FI97/00787 filed Jun. 17, 1996.

BACKGROUND OF THE INVENTION

The invention relates to a precision-mechanical positioning device for positioning a second component relative to a first component in any of the directions perpendicular to a combined straight line between the components, the positioning device comprising: a stationary basic member included in the first component and having a first plane sliding surface perpendicular to the said straight line a support member included in the second component and having a second plane sliding surface; the support member being connected to the basic member such that the second sliding surface bears against the first sliding surface, forming a pair of sliding surfaces; and the support member comprising at least two holes transverse to the plane of he pair of sliding surfaces, locking means comprising shanks extending through these holes to the basic member, the thickness of the shanks in a direction transverse to the hole length being smaller than the hole diameter, and clamping means for pressing the support member into immobile contact with the basic member after the positioning has been performed. The invention relates in particular to the positioning of an optical element, such as a set of lenses, relative to a second optical component, such as a laser or any other source of radiation, and particularly in a direction perpendicular to the direction of motion of the radiation.

The inventor's previous Patent Application, WO95/32508, describes a precision-mechanical positioning device for positioning a second component relative to a first component parallel with a straight line between the components, which is typically the optical axis of these, in other words, the positioning takes places in the axial direction. The structure described in this publication allows extremely accurate axial adjustment, however, when a set of lenses is to be positioned for instance relative to an emitting laser or the like, adjustment transverse to the optical axis will be required in addition to the adjustment parallel to the optical axis as described in this publication, for the optical axis of the set of lenses to be positioned at the right: location in the beam of rays.

Adjusting devices for moving an element in a specific plane, i.e. perpendicular to any straight line, such as an optical axis, have been accomplished with the use of, for instance, micrometric screws operating in mutually perpendicular directions parallel to the plane, enabling adjustment parallel with the plane to be obtained with adequate accuracy. Nevertheless, such a design using micrometric screws will be extremely complex, because one has to take care that the use of the one micrometric screw does not interfere with the positioning already performed by means of the other micrometric screw. Due to this complex design, the structures still frequently include non-controllable plays, which in reality result in a very awkward and slow positioning operation. In addition, such complex structures which comprise several components requiring high precision are very expensive.

The prospectus THORLABS INC., USA, May 1995, describes on pages 24 to 25 slip plate positioner, which in terms of the description in the prospectus, is designed to provide for instance coarse X, Y positioning of optical components. The structure comprises a stationary basic member having a protruding planar dry sliding surface, and a support member having a second planar dry sliding surface, the surfaces being maintained slightly pressed against each other by means of two helical springs subjected to tensile stresses. This structure yields an unlubricated pair of sliding surfaces, the outer support member being manually movable relative to the stationary basic member in a direction parallel to this plane. In addition, the device comprises two locking screws, whose heads get into direct contact with the outer surface of the support member during the tightening of the screws, and which extend through holes in the support member to the basic member, which is provided with counter-threads. The diameters of the helical screws are smaller than the diameter of their positioning holes in the support member, and similarly, the thickness of the shanks of the locking screws is smaller than the diameter of their through-holes in the support member, and further, the diameter of the pins passing through the entire structure is smaller than the diameter of their through-holes in the support member. This arrangement enables the support member to be manually shifted in the plane of the pair of sliding surfaces within the range allowed by the plays ±1 mm, and to be locked into position after adjustment. The optical. components are fastened to the support member by some means not illustrated here. In practical testing, the structure described has at least the following shortcomings. When the support member is to be shifted in some direction, it is difficult to get moving, however, when it does move, its movement is usually excessive in practice, and in turn, when the approximately correct position is to be resumed, the support member moves too far again, not allowing the centration desired to be approached under control, but instead, there will be a nearly infinite number of attempts in various directions, one of which might eventually bring the support member close to its correct position. The problem described above is probably due to the commonly known physical fact that the filly developed static friction prevailing between two surfaces is greater than the dynamic friction. Should the support member after all be centred in its correct position with adequate accuracy in the structure described in the prospectus, the positioning of the support member would anyhow be dislocated again when the locking screws are tightened. Thus, it is quite impossible to achieve sufficient precision with the positioner mentioned in the prospectus for instance in the positioning of a set of lenses relative to a laser. In practice, the optimal adjustment precision obtained with some degree of reliability by means of the structure in the prospectus has proved to be of the order of 0.1 mm, which is not at all sufficient for the positioning of a set of lenses relative to a laser, and for other optical applications as well. For this reason it is understandable that the prospectus stresses explicitly that it is merely designed to provide coarse positioning, without aiming to provide the positioning accuracy finally desired.

SUMMARY OF INVENTION

Thus the object of the invention is to provide a precision-mechanical positioning device for positioning a second component relative to a first component in any of the directions perpendicular to a combined straight line between the components, i.e. in any directions of a plane, which allows rapid and simple positioning with high precision. The positioning accuracy should be suitable and sufficient for positioning for instance a set of lenses relative to a radiation emitting laser or vice versa, for positioning the laser relative to the set of lenses. This implies a positioning accuracy notably above the order of 0.1 mm, preferably of the order of 0.01 mm or above. A second object of the invention is such a precision-mechanical positioning device having a structure as simple as possible and not comprising components entailing plays which are difficult to control. A third object of the invention is such a precision-mechanical positioning device which is suitable for use together with the inventor's previous axial adjusting device, which hag been described in the specification WO 95/32508. Hence the general purpose of the invention is to provide a precision-mechanical adjustment device allowing a second component to be positioned relative to a first component in the direction of a specific plane and having a simple and reliable structure and low production costs.

The drawbacks described above are overcome and the objects are achieved by means of a precision-mechanical positioning device in accordance with the invention, which is characterised by the features defined in the characterising clause of claim 1.

The most essential advantage of the precision-mechanical positioning device of the invention is that it enables for instance the optical axis of a set of lenses to be positioned with adequate accuracy relative to the optical axis of a laser, or inversely, perpendicularly to the combined straight line formed by these optical axes. The positioning accuracy achieved is usually of the order of 0.01 mm, being, however, of the order of 0.001 mm in optimal cases. A second advantage of the invention is that the high positioning accuracy mentioned above is achieved without having to use complex micrometric screw structures, but instead, positioning can be carried out manually, approaching the correct final position under control. With the use of the precision-mechanical positioning device of the invention, the exertion of force to the second component and especially to its support member, in order to shift it relative to the first component and particularly to its basic member, does not generate sudden and uncontrolled jerks, as prior art structures do. Further, with the use of the precision-mechanical positioning device of the invention, the locking of the support member relative to the basic member, after it has been positioned in its final position as desired, does not generate any movement of the support member relative to the basic member, as is the case in prior art devices.

The invention will be described in greater detail below with reference to the accompanying drawings.

DETAILED DESCRIPTION OF DRAWINGS

Figure 1:
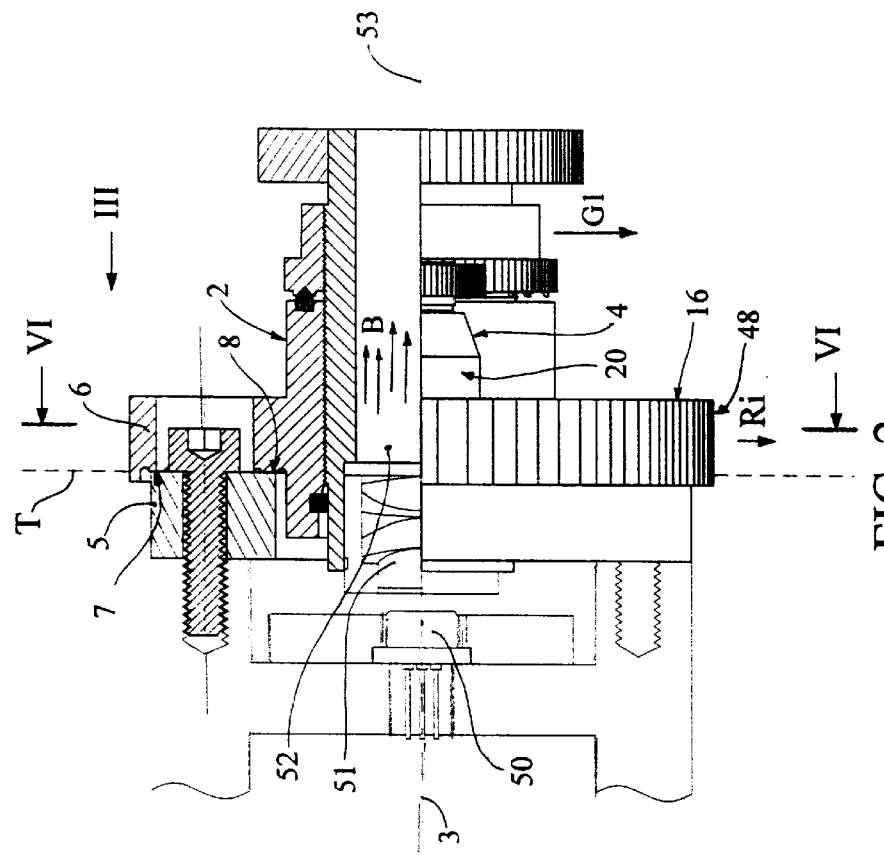
FIG. 1 shows a preferred embodiment of the precision-mechanical transverse positioning device of the invention as a partial top view in direction Ib of FIG. 3 and taken as a partial longitudinal section along plane Ia—Ia of FIG. 3 parallel to the radiation source and to the optical combined axis of the set of lenses.
Figure 2:
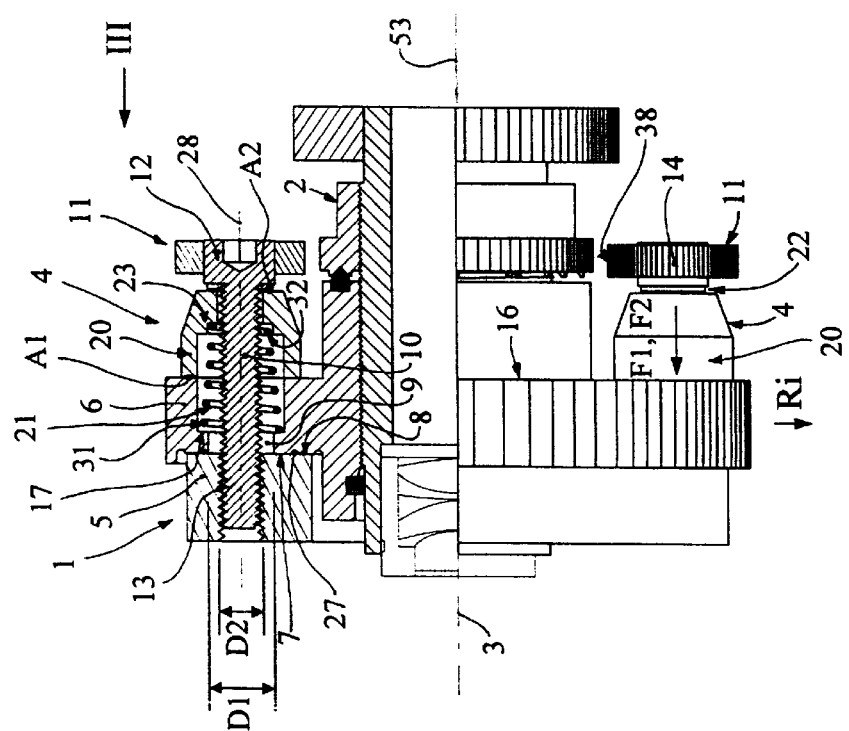
FIG. 2 shows the embodiment of the precision-mechanical transverse positioning device of FIG. 1 from another direction as a partial lateral view in direction IIb of FIG. 3 and taken as a partial longitudinal section along plane IIa—IIa of FIG. 3 parallel to the optical combined axis.
Figure 4:
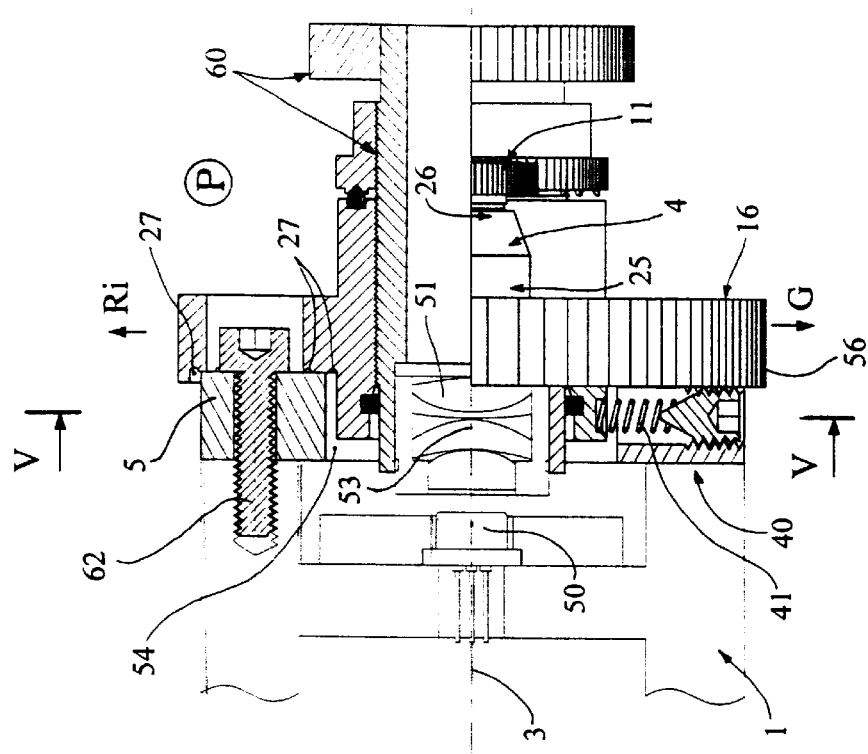
FIG. 4 shows a variant of the precision-mechanical positioning device of the invention in the same projection as FIG. 2, but with the longitudinal section parallel to the combined axis along plane IV—IV of FIG. 5.
Figure 3:
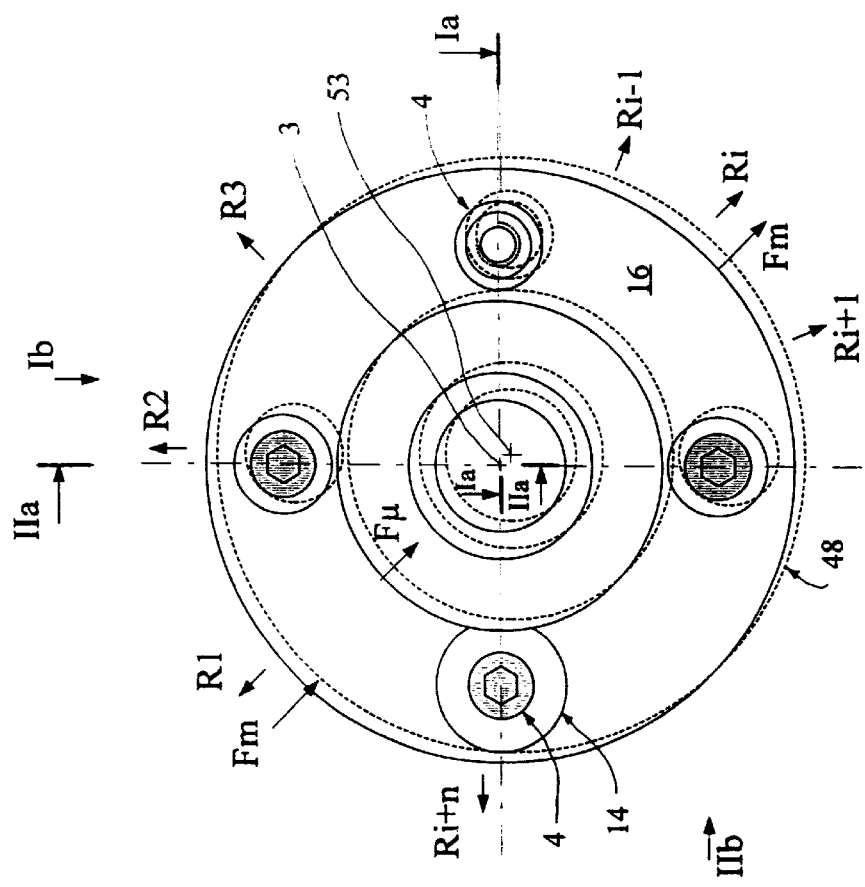
FIG. 3 shows the outside of the embodiment of the precision-mechanical transverse positioning device of FIGS. 1 and 2 parallel to the optical combined axis, viewed from the front in direction III of FIGS. 1 and 2.

The figures show a first component 1, which is an integrated component of the device in each case. This first component 1 has by some suitable means been firmly connected with an optical component such as a laser 50, any other radiation source or similar component or combination of components, such as optionally a radiation-permeable set of lenses or a set of mirrors reflecting radiation at least partly, which has an optical axis 3 or any similar central line, relative to which the other components should be positioned. The precision-mechanical positioning device further comprises a second movable component 2, which in this case consists of a radiation-permeable set of lenses 51, or a not-illustrated optical component comprising a set of mirrors which reflects radiation at least partly, and mostly effectively, or any similar component or combination of components, such as a radiation source, which also has an optical axis 53. The purpose of the transverse positioning device is to enable, for instance in this application, the positioning of the optical axis 53 of the set of lenses 51 or the set of mirrors relative to the optical axis 3 of the laser 50, or vice versa, the positioning of the optical axis 3 of the laser relative to the set of lenses or to the optical axis 3 of the set of mirrors, respectively. The second component 2 generally includes means 60 not illustrated in this application for positioning this set of lenses 51 parallel to the optical axis 53 of the set of lenses. These means for axial adjustment 60 are preferably of the type described in the publication WO 95/32508 relating to the same inventor's previous invention, but it may, however, be any structure suitable for this purpose. Using the transverse positioning device, the second component 2 can be positioned relative to the first component 1 in any of the directions Ri shown in FIG. 3 which are perpendicular to a combined straight line 3, 53 between the components. In this context, one combined straight line and one combined axis mean the optical axes 3, 53 together of both the laser diode 50 and the set of lenses 51, and accordingly, two parallel lines together of any similar combination of components, because the object is to position these axes or lines, i.e. to join them, and because they are parallel even when unpositioned, although spaced by a small distance. In this application, the direction and position intended for these straight lines or lines of these optical axes or similar to be mutually positioned is called one combined straight line or combined axis.

For the positioning of the second component 2 relative to the first component 1 in a plane T in any of directions R1 . . . Ri . . . Ri+n, there being an infinite number of directions Ri and the plane being perpendicular to the said combined straight line 3, 53, the transverse positioning device comprises the following components. The first component 1 includes a solid basic member 5 having a first planar sliding surface 7 perpendicular to the said combined straight line and the second component includes a support member 6 having a second planar sliding surface 8, the support member having been connected to the basic member such that the second sliding surface 8 bears against the first sliding surface 7, forming a pair of sliding surfaces 7, 8. This pair of sliding surfaces 7, 8 forms a plane T, which is then perpendicular to the combined straight line 3, 53. The basic member 5 is firmly attached to the first component e.g. by means of screws 62, being thus replaceable whenever necessary. In addition, the support member 6 has a through-hole 52, in this case for the set of lenses 51, or in a second embodiment, for the radiation source and its axial adjusting device 60, or alternatively, only for radiation B passing through the device, the set of lenses 51 and the axial adjusting device 60 being then fastened to the support member 6 outside the opening 52. There is obviously a corresponding opening, or as in the figures, a larger opening 54 also in the basic member 5, also for optical components such as a laser 50, a set of lenses 51, axial adjusting means 60 and/or radiation B. In the case of the figures, this opening 54 is large enough to receive many of the constituents of component 2, however, embodiments are also conceivable in which opening 54 is very small, and in that case, the second component 2 including its constituents will be located entirely outside the first component 1 and its integrated basic member 5. The first component 1 and the second component 2 may be in any mutual relationship, such as different parts of the same device, being then directly connected, or parts of different devices, communicating then e.g. via the ground alone. The light source and the set of lenses may be spaced by a short distance, as in the examples illustrated, or by quite a long distance.

The support member 6 has at least two through-holes 9 transverse to the plane T of the sliding surface pair 7, 8, locking means 4, described in detail below, including shanks 10 at the support member, extending through the holes to the basic member 5. The thicknesses D2 of the shanks 10 are essentially smaller than the hole diameters D1 in a direction transverse to the length of the holes at least over the thickness of the support member 6, i.e. the shanks 10 of the locking means are inserted with a play into the holes 9 of the support member 6. In addition, the locking means 4 comprise clamping means 11, described in greater detail below, for pressing the support member after it has been positioned into immobile contact with the basic member 5. In accordance with the invention, it is preferable that the pair of sliding surfaces 7, 8, like these locking means 4, are disposed symmetrically around the opening 52 in the support member 6. In the embodiment of the figures, there are two locking means 4 on opposite sides of the opening 52, however, there may of course be more than two locking means, such as three or four. The symmetrical disposition produces a regular compression between the sliding surfaces 7 and 8, reducing the inclination tendency of the optical axis 53 of the set of lenses 51 relative to the optical axis 3 of the source of radiation.

In accordance with the invention, a layer S1 of fatty lubricant is provided between the first sliding surface 7 and the second sliding surface 8 of the positioning device, the layer not being shown in the figures because of its minuscule thickness. In this conjunction, the fatty lubricant S1 implies a lubricant with a consistency such that the lubricant S1 is not fluid, i.e. unctuous, under the conditions of use for the positioning device of the invention, but it is not completely solid either. At the operating temperature, the fatty lubricant S1 should be at least slightly plastically resilient with the forces Fm to be used in the positioning of the device, i.e. for shifting support member 6 relative to the basic member 5. The purpose is to provide a relatively high friction U1 between the sliding surfaces 7 and 8 compared with the friction U2 between the clamping devices described below. It is currently assumed that such a viscous lubricant yields a relatively high friction coefficient $\mu 1$ between the sliding surfaces 7, 8, which is basically independent of the speed of moving the support member 6, and preferably, as independent as possible of the speed of movement. It is assumed at present that the fatty lubricant has a consistency such that the ASTM D 217 standard penetration value is in the range from 350 to 120, however, preferably in the range from 270 to 200. This implies nearly an NLGI number in the range from 1 to 5 and preferably in the range from 2 to 4. Tests have shown the positioning device of the invention to function extremely well as intended with a lubricant having an NGLI number in the range from 1 to 3, and for instance with a lubricant having an NGLI number of 2, when the device is used at normal room temperature. The basic ingredient of this fatty lubricant S1 may be a natural, i.e. vegetal or animal, petroleum-based or synthetic oil, such a gelled oil, a macromolecular, natural, i.e. vegetal or animal, petroleum-based or synthetic compound with properties resembling those of a fat. The lubricant S1 may consist of such a compound alone or a mixture of such compounds. In addition to this basic ingredient, the fatty lubricant S1 used in the positioning device of the invention may contain any suitable one or more additives, such as one or more solid lubricants. Potential solid lubricants to this end are for instance molybdene sulphide, polytetrafluorethylene, fluorethylene-propylene-copolymer, graphite, niobium selenide, wolfram disulphide, wolfram selenide, lead sulphide, lead oxide or antimonium trioxide. The lubricant may, of course, contain other additives known per se as well.

In addition, the first sliding surface 7 and the second sliding surface 8 have been designed with such an exactly matching shape that the pressure P of the ambient gaseous atmosphere retains these sliding surfaces in position under the air-removing effect of the fatty lubricant S1 after these sliding surfaces 7, 8 have been pressed together. This is easy to observe in practice in that, after the fatty lubricant S1 has been applied to one or both of the sliding surfaces 7, 8 and the sliding surfaces are being pressed together with a suitable force to form a pair of sliding surfaces in the assembly of the device, causing the lubricant S1 to spread evenly between the surfaces 7 and 8 so that air is essentially removed, the removal of the support member 6 from the basic member 5 will require an appreciable force, although the surfaces are not joined by any mechanical structure, but only bear against one another. Owing to the action of a fatty lubricant S1 of the type described above, the fully developed static friction in the precision-mechanical transverse positioning device of the invention is optimally maintained as such, or essentially equal to the dynamic friction, i.e. at a value $F\mu$. It should be noted in this conjunction that in this structure of the invention, the dynamic friction denotes only the extremely low speed generated by the positioning of the support member relative to the basic member, the behaviour of these lubricants differing from their properties in normal high-speed applications. In the precision-mechanical transverse positioning device of the invention, the shifting of the support member relative to the basic member at for instance a rate of 1 mm per second is already a high speed in this application, and hence the lubrication of the structure of the invention is by no means comparable to usual lubrication processes in bearings, for instance. It is currently assumed that the benefit of such a fatty lubricant S1 of the invention is based on the fact that the lubricant is of a type in which a shearing action occurs as the support, member is shifted relative to the basic member, however, the force required by this shear is independent of the speed of motion, at least with these particular low speeds. In this context, it is particularly stressed that the purpose of the lubricant S1 of the invention is not to provide minimum friction between the sliding surfaces, but a suitable friction $F\mu$, which is as independent as possible of the speed of motion, i.e. the shear rate of the lubricant S1. Thus it is also currently assumed that a fully developed static friction is at least of the same order as dynamic friction, and preferably as close as possible to the value of dynamic friction. To control the amount of fatty lubricant S1 between the sliding surfaces 7, 8 and to prevent any extrusion, one or more fat grooves 27 are advantageously provided on the first sliding surface 7 and/or the second sliding surface 8, in the area of the pair of sliding surfaces. This or these fat grooves 27 are preferably concentric with the combined straight line 3, 53. The fat grooves 27 are typically peripheral grooves on the sliding surfaces.

In addition, between the clamping means 11 and the support member 6, the precision-mechanical positioning device of the invention has a bushing 20 surrounding the shank 10 of the locking means and/or a washer 22 and/or washers, which, in one or all of the manners described below, generate a lower friction U2 between the clamping means 11 and the support member 6 than the friction between the support member 6 and the basic member 5, where a higher first fiction U1 prevails as described above. The second friction U2 between the clamping means and the support member is in any case lower than the friction U1 between the sliding surfaces 7, 8, and preferably the second friction U2 is as low as possible compared with the first friction U1, and then it should be noted that the friction U1 should still be moderate enough to allow the support member 6 to be movable relative to the basic member. Thus, the first friction U1 cannot be excessively high, but one should endeavour to reduce the second friction U2 as far as possible. With this proceeding, a force or torque parallel to the plane T is not readily transferred from the clamping means 11 to the support member 6, which does not, in turn, tend to move relative to the basic member 5 as the support member is pressed by means of the clamping means 11 into an immobile position relative to the basic member 5 in a clamping direction F1 perpendicular to the plane T, after the support member has been fitted into position parallel to the plane T of the pair of sliding surfaces 7, 8. The frictions U1 and U2 can typically be acted on by providing appropriate corresponding friction coefficients $\mu 1$ and $\mu 2$, i.e. the first friction coefficient $\mu 1$ relatively high as described above, and the second friction coefficient $\mu 2$ as low as possible. There are also other means for obtaining the desired frictions U1 and U2 and especially their mutual relationship as described above, these means being presented below.

In the embodiment of the figures, the locking means are screws 12 equipped with a functional head 14, with a male thread on their shank 10 and female counter-threads 13 in the basic member 5. As the screws are tightened, their functional head 14 presses the support member e.g. through bushings 20 against the outer surface 16 of the support member and further the support member against the basic member. Quite similarly, the locking means may comprise locking pins unrotatably attached to the basic member and having a male thread, with a nut with a female tread on these, the nut pressing first the support member itself and then the support member against the basic member when tightened e.g. by means of the bushing 20. The locking means may also be pins fastened to the basic member 5 and eccentric means rotatable at the outer ends of these at the nut or functional head 14 mentioned above. The swivelling axis of such an eccentric means is transverse to the length of the pin, the length equalling the length of the screw of the embodiment shown in the figures, and thus the rotation of the eccentric means generates a force which presses the support member through the bushing 20 and further the sliding surfaces 7, 8 against one another. The bushing 20 mentioned above, different washers or similar are located between the functional head 14, the nut or the eccentric means mentioned above, and the outer surface 16 of the support member 6 which faces away or in a direction opposite to the second sliding surface 8 of the support member. The compression force F1 of the nut of the functional head or the eccentric means, which locks the support member to the basic member and is exerted essentially in a direction perpendicular to the plane T of the pair of sliding surfaces, is thus transmitted to this outer surface 16 of the support member through this bushing 20. The screws 12 mentioned above can naturally be disposed in the precision-mechanical positioning device of the invention inversely to the layout illustrated in the figures, implying that the counter-threads 13 of the screws are provided in the support member 6 of the second component 2, the shank 10 of the screws passing then through the holes 9 having a greater diameter in the basic member of the first component 1. The bushings 20 are then located on the side of the support member facing away from the support member. The immobility of the basic member 5 as defined above only means immobility relative to the first component, but does not by any means imply absolute immobility relative to some outer components and the real or virtual system of coordinates generated by these.

In accordance with the invention, the locking means 4 of the transverse positioning device comprise the means for reducing the second friction U2 mentioned above for the bushing 20 or similar means, which operate when the functional head, the nut or the eccentric means are used to press the sliding surfaces 7, 8 against one another. These means can be formed in many different ways.

Firstly, the bushing can be shaped such that the first contact area A1 between the first end 25 and the outer surface 16 of the support member is greater than the second contact area A2 between the second end 26 of the bushing and the clamping means, such as the functional head or the nut or the eccentric means. This generates a slightly hiker friction in the first contact area A1 than in the second contact area A2. Nevertheless, this is apparently a relatively uncertain process, which is prone to malfunctions. As a second alternative, a higher friction coefficient $\mu 3_a$ can be arranged by various means in the said first contact area A1 than the friction $\mu 4_a$ prevailing in the said second contact area A2. As a third alternative, a lower friction coefficient $\mu 3_b$ can be arranged by various means in the said first contact area A1 than the friction coefficient $\mu 4_b$ prevailing in the said second contact area A2. These friction coefficients can be produced by several different means, A high friction coefficient can be produced either by a proper choice of material for the components placed against one another, or by equipping the surfaces placed against one another for instance with asperities, flutings transverse to the periphery of the bushing or the washer, which allow a movement parallel to the shank 10 while preventing a movement parallel to the periphery of the bushing or a radial movement. The friction coefficient, in turn, is reduced by placing one or more plane washers 22 between the surfaces placed against one another, in the second contact area A2, as in the embodiment illustrated. In addition to or instead of this, the materials for the components placed against one another, such as the bushing 20 and the functional head 14 of the clamping means 11, the nut or the eccentric means, and also for the one or more washers 22, can be selected so as to generate as low as possible a total friction coefficient $\mu 4$ between these. Moreover, the friction coefficient can be reduced for instance in the second contact area A2 by providing a lubricant S2 of any type known per se to reduce the friction coefficient as far as possible between the second end of the bushing and the clamping means 11 and the one or more washers 22, as has been done in the embodiments of the figures. In this context, we emphasis that the purpose of the lubricant S2 used in for instance the second contact area is to reduce the friction as far as possible. Hence this is a different lubrication or lubricant than the fatty lubricant S1 used between the first sliding surface 7 and the second sliding surface 8, as explained above. If, in turn, the inverse alternative described in the previous paragraph is aimed at, in which the bushing 20 explicitly rotates relative to the support member 6, a low friction can of course be arranged in the first contact area A1 for instance by means of a low total friction coefficient $\mu 3$. The arrangement is analogous in other respects. As a fourth alternative, low friction coefficients can also be provided as described above both in the first contact area A1 and in the second contact area A2.

The following solutions, for instance, provide other means for reducing the second friction U2. As a fifth alternative, in the case that the locking means 4 comprise screw bars and luts to be screwed on these, the portion of the screw bar which is located at the one end 26 of the bushing can be given an angular shape for instance, and the hole at the other end 26 of the bushing can be given a matching angular shape, so that the bushing slides along this screw bar without rotation as the nut is twisted and thus tightened. The bushing 20 and the support member 6 will not have any interaction, which means that there will be minuscule effective friction between them. As a sixth alternative, the means for reducing the second friction U2 in all of the structures is to interconnect the bushings 20 of the locking means 4 on different sides of the opening 52, for instance with a band 49, also preventing them from rotating. In this case as well the bushing 20 and the support member 6 have no interaction, which means that there will be minuscule effective friction between them. This sixth embodiment can be applied regardless of which of the above structures the locking means comprise and regardless of the bushings 20 of other types of washers or inserts used between the support member and the mobile parts of the clamping means 11. A seventh embodiment comprises the use of springs pressing the sliding surfaces 7 and 8 against one another e.g. to prevent rotation of the bushing 20, as explained below, which also means minuscule or very low effective friction between the bushing and the support member 6.

In the preferred embodiment of the invention, the positioning device comprises, at each bushing 20, e.g. inside the bushing, a press spring 21, whose first end 31 bears against the outer surface 16 of the support member or the outer surface 17 of a recess in the support member, this embodiment being illustrated in the figures. The second end 32 of the press spring 21, in turn, bears against the stop face 23 of the bushing, located at the second end 26 of the bushing 20 and opening into or pointing in the same direction as the second sliding surface 8. This press spring 21 has several favourable effects. Firstly, the press spring 21 maintains a nearly constant compression force F2 forcing the first and the second sliding surface against one another, contributing to a constant friction $F\mu$ between the sliding surfaces, contributing in turn to the positioning desired for the support member and also preventing unintentional movement of the support member relative to the basic member at the stage of locking the support member. In addition, this press spring 21 will act as anti-rotating means for the bushing 20, which, with the mechanism described above, will result in minuscule effective friction between the bushing and the support member and especially between the functional head 14 of the clamping means 11 and the support member 6, because the spring counteracts the interaction between the bushing and the support member. This effect is due to the fact that there is a friction U3 between the first end 31 of the press spring 21 and the outer surface 16 or 17 of the support member 6, and in addition, there is a friction U4 between the second end 32 of the press spring and the stop face 23 of tile bushing. Owing to the torsional rigidity of these frictions U3 and U4 and of the press spring 21, the spring tends to maintain the bushing in a solid position relative to the support member 6. The press spring 21 will maintain the bushing immobile against rotation particularly well if the frictions U3 and U4 are as high as possible, which can be achieved e.g. by interlocking the first end 31 of the spring and the support member, and similarly, by interlocking the second end 32 of the spring and the bushing 20. This locking could be performed in a manner not illustrated in the figures, by turning for instance the extreme ends of the helical spring nearly parallel to the central line of the screw 12 and by inserting these into matching holes in the support member 6 and the bushing 20. In any case, it is advantageous to give the opposite ends 31, 32 of the press spring at least partly a plane shape, and preferably its so to a maximum extent, or to design them as any other surface nearly symmetrical with the central line 28 of the spring, and/or to give the surfaces of the support member and those of the bushing facing the spring a shape matching that of the spring, so that the spring is maintained in a straight position and does not exert bending forces on the bushing 20, the locking being thus performed with greater precision. Moreover, the positioning of the support member in various directions will be as regular as possible, because the spring will tilt and/or slide in the positioning directions during the positioning. In case the sliding surfaces 7 and 8 of the invention are either horizontally or almost horizontally positioned, the press springs 21 can be replaced with a compression generated by the weight of the component above the pair of surfaces 7, 8 or by the weight of the associated support member 6 or by the weight of any similar component connected with these. The weight of such a Component can, of course, be selected so as to provide the desired compression between the sliding surfaces 7 and 8.

In the preferred embodiment of the invention illustrated in the figures, the press springs 21 are helical springs placed on the screws 12 or screw rods or locking pins fastened to the basic member, concentrically with these. In this way, the central line 28 of the screw rod preferably joins the longitudinal central line of the screw 12, the central line being perpendicular to the plane T of the the pair of sliding surfaces 7, 8. The free length of the press springs 21 is preferably greater than the distance between the outer surface 16 of the support member or the outer surface 17 of its recess and the stop face 23 of the bushing, the press spring 21 generating the compression force P2 mentioned above even if the screws 12 or corresponding nuts on the screw bars or eccentric means at the ends of the locking pins have been unscrewed so as to allow the support member to be shifted relative to the basic member 5.

The precision-mechanical positioning device of the invention as described above operates so that the screws 12 equipped with a functional head 14 are unscrewed and the user grips the outer periphery 56 of the support member 6 or the press-buttons 45 described below with his fingers and slides the support member 6 including its components 60 parallel to the plane T of the pair of sliding surfaces 7, 8 in the direction Ri required in each case. When the correct position has been found, the user screws the support member into immobile contact with the basic member by means of the functional head of the locking means 4, such as screws 12, and then the positioning perpendicular to the combined straight line 3, 53 has been completed.

Especially in applications where the direction of the plane T of the pair of sliding surfaces 7, 8 diverges from the horizontal plane, as is often the case, the precision-mechanical positioning device of the invention can be provided with anti-creep means 40, which prevent a shift of the support member relative to the basic member 5 when the positioning of the support member 6 relative to the basic member 5 has been completed as described above, so that the straight line 53 joins the straight line 3, but their interlocking has not yet been performed. In fact, if the set of lenses 51 and the device 60 for its axial adjustment are heavy, the support member may tend to creep in the direction of the gravital force G under their effect, especially when the direction of the plane T of the pair of sliding surfaces is vertical. These anti-creep means 40 comprise a carrier spring 41 between the support member 6 and the basic member 5, the direction of action of the spring force of the spring having a component F3 parallel to the plane T of the pair of sliding surfaces. In the embodiment illustrated in the figures, the carrier spring 41 is a helical spring, whose central line is parallel with the plane T of the pair of sliding surfaces. The carrier spring 41 has been placed in a position cavity 44 in the basic member and it is supported at its lower end by a locking means screwed onto the basic member at location 42. The other end of the carrier spring is supported by the support member, for instance a recess in this, at location 43. The position cavity 44 of the carrier spring has a substantially greater diameter than the external dimension of the spring, as illustrated in the figures. At least one additional point of support, such as the lower point of support 42 in the figures, has been shaped as a cone or a wedge, central line being perpendicular to the plane T of the the pair of sliding surfaces 7, 8. The free length of the press springs 21 is preferably greater than the distance between the outer surface 16 of the support member or the outer surface 17 of its recess and the stop face 23 of the bushing, the press spring 21 generating the compression force F2 mentioned above even if the screws 12 or corresponding nuts on the screw bars or eccentric means at the ends of the locking pins have been unscrewed so as to allow the support member to be shifted relative to the basic member 5. The press springs 21 described above are however necessary only in case, when the sliding surfaces 7, 8 are machined in an accuracy of standard fine mechanical practice, whereupon the sliding surfaces deviate in the order of 100 $\mu$m–200 $\mu$m from an ideal plane, and generally into a direction of a cup like surface. When the planeness of the sliding surfaces 7, 8 has a higher accuracy, which is possible with a special technology, whereupon a deviation on only a few tens of $\mu$m, e.g. $\leq$60 $\mu$m or $\leq$40 $\mu$m, from an ideal plane is reached, the press springs 21 can be left out. In this later case with high planar accuracy in the sliding surfaces 7, 8, the mechanical pressing of these two surfaces can be avoided, evidently because the atmospheric pressure takes care of all the necessary contact between the surfaces.

The precision-mechanical positioning device of the invention as described above operates so that the screws 12 equipped with a functional head 14 are unscrewed and the user grips the outer periphery 56 of the support member 6 or the press-buttons 45 described below with his fingers and slides the support member 6 including its components 60 parallel to the plane T of the pair of sliding surfaces 7, 8 in the direction Ri required in each case. When the correct position has been found, the user screws the support member into immobile contact with the basic member by means of the functional head of the locking means 4, such as screws 12, and then the positioning perpendicular to the combined straight line 3, 53 has been completed.

Figure 5:
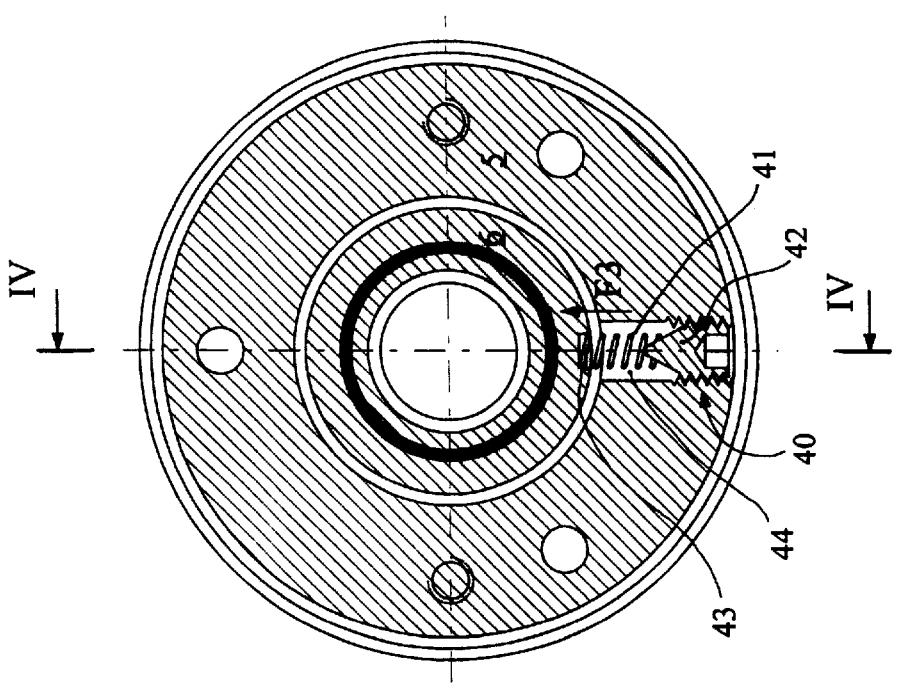
FIG. 5 shows the embodiment of FIG. 4 in a section perpendicular to the optical combined axis along plane V—V of FIG. 4.

Especially in applications where the direction of the plane T of the pair of sliding surfaces 7, 8 diverges from the horizontal plane, as is often the case, the precision-mechanical positioning device of the invention can be provided with anti-creep means 40, which prevent a shift of the support member relative to the basic member 5 when the positioning of the support member 6 relative to the basic member 5 has been completed as described above, so that the straight line 53 joins the straight line 3, but their interlocking has not yet been performed. In fact, if the set of lenses 51 and the device 60 for its axial adjustment are heavy, the support member may tend to creep in the direction of the gravital force G under their effect, especially when which increases the inclination of the carrier spring without interfering with the mutual positioning between the support member and the basic member. As is known, this positioning takes place parallel to the plane of the figure for instance in the projection of FIG. 5, where the support member 6 moves relative to the basic member 5 in any direction Ri of FIG. 3, whereby the carrier spring 41 should allow this movement with minimum resistance and interference. In this case, the carrier spring 41 has been placed in the plane IV—IV, which is vertical at the location of the device, so that the carrier spring 40 receives part of the weight of the support member 6 and the associated optical components 51 and their adjusting devices 60. The direction of action of the spring force of the carrier spring 41 has a component F3 in the direction of the pair of sliding surfaces which is maximally equal to the force G1 generated by the weight of the support member and the attached devices,e with an opposite direction, however. At least the component F3 of this force is equal to the force G1 generated by the weight of the support member and the attached devices, form which the frictional force F$\mu$ of the pair of sliding surfaces 7, 8 is subtracted, but with an opposite direction, i.e. F3<G2=G1−F$\mu$. With is dimensioning, the carrier spring 41 will not under any circumstances tend to lift the support member with its attached devices, but will essentially reduce or altogether eliminate the tendency to creep downwards caused by the weight of the support member and the attached devices. Consequently, this embodiment is intended for situations in which optical axes to be mutually positioned, i.e. the combined straight line 3, are horizontal. Such a spring structure is not required when the optical axes, i.e. the combined straight line 3 in the device, are vertical, the sliding surfaces 7, 8 being then horizontal or almost horizontal.

Figure 6:
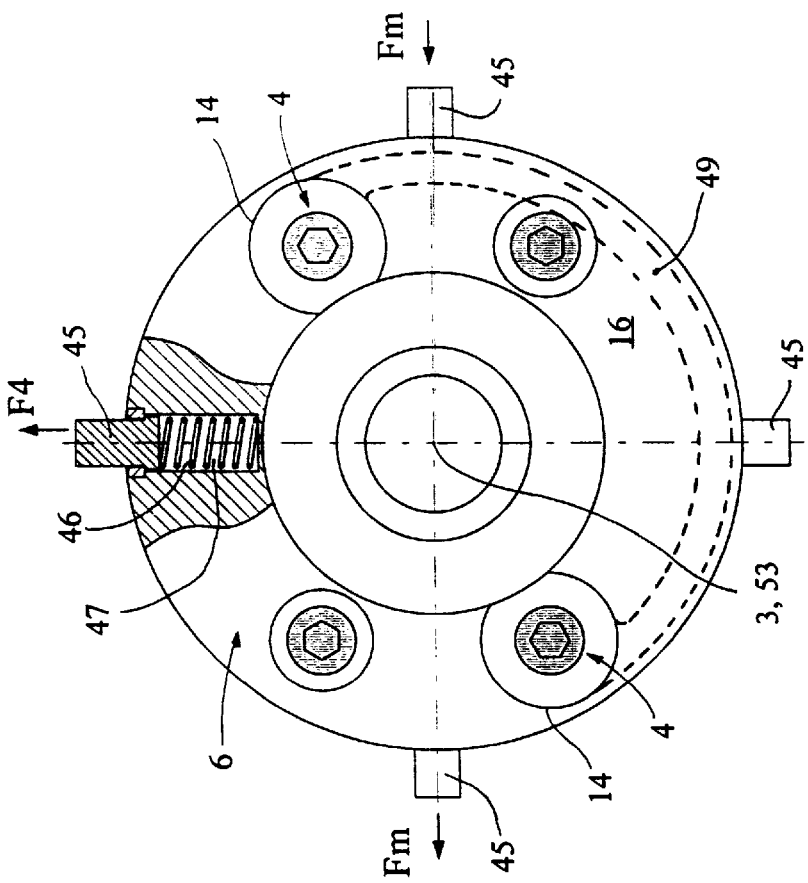
FIG. 6 shows a further variant of the precision-mechanical positioning device of the invention essentially in the same projection as in FIG. 3, but with the partial longitudinal section along a plane corresponding to plane VI—VI of FIG. 2.

In addition to the means mentioned above, the shifting of the support member 6 relative to the basic member 5 can be performed with higher precision by using push-buttons 45 placed in the support member and moving parallel to the plane T of the pair of sliding surfaces 7, 8. There are typically two pairs of such push-buttons, the push-buttons in one pair being opposite each other on the periphery of the support member and the lines between the pairs advantageously perpendicular to one another, as shown in FIG. 6. The push-buttons have been adapted to move for instance in holes 47 provided in the support member and the push-buttons have been adapted to bear against the support member through a compensating spring 46. This compensating spring has been prestressed so as to keep each push-button 45 pressed away from the combined straight line 3 with the force F4. This initial tensile force F4 has been selected with the aid of the stiffness of the compensating springs 46 such that the force F4 generated by the initial tension is smaller than the frictional force F$\mu$ between the sliding surfaces 7 and 8. On the other hand, the stiffness of the compensating springs 46 has been selected such that, when the push-button 45 is pressed, the frictional force F$\mu$ is exceeded, and the support member moves relative to the basic member before the compensating spring is completely compressed, i.e. pressed to the bottom. Thus, when the user grips the basic member with the force Fm merely through the push-buttons 45, he will use an activating force attenuated by the compensating springs 46 to shift the support member, and thus the positioning of the optical axis 53 relative to the second optical axis 3 will be performed with still greater accuracy.

Considering the use, it is particularly advantageous that the peripheral surface 48 of the support member 6 has a circular shape in a plane perpendicular to the combined straight line, as shown in the figures, unless the push-buttons described above are used. The peripheral surface may also be provided with asperities or the like to improve the user's grip. The peripheral surface 38 of the functional heads 14 or the corresponding nuts are also advantageously given a circular shape or provided with asperities, so that they are easy to use to perform at least the initial tightening by hand, and no tools will be needed. In this way, the tightening can be performed from different sides and gradually, thus further ensuring the solid position of the support member.

The embodiments of the invention can obviously diverge substantially from those described above, while still remaining within the scope of the invention as defined by the claims. Thus, especially all the springs described may be of some other type than helical springs, they may be for instance cup springs or catch springs. Also, in the examples described above, the springs generate compression stress during their operation, however, structure variants of the invention can very well be designed, in which one or more springs generate tensile stress during their operation. All the same, it is essential that the action of compression stress is provided between the sliding surfaces 7, 8.

The transverse positioning device in accordance with the invention enables any component of an optical system to be positioned relative to any other component in the same optical system. The invention may also have other precision-mechanical applications than optical systems, even if these are regarded as primary in this application.

What is claimed is:

1. A precision-mechanical positioning device for positioning a second component (2) relative to a first component (1) in any of the directions (Ri) perpendicular to one combined straight line (3) connecting the components, the positioning device comprising:

a solid basic member (5) integrated in the first component and having a first planar sliding surface (7) perpendicular to the said straight line;

a support member (6) integrated in the second component and having a second planar sliding surface (8);

the support member being connected with the basic member such that the second sliding surface bears against the first sliding surface, thus forming a pair of sliding surfaces (7, 8); and the support member comprising at least two holes (9) transverse to the plane (T) of the pair of sliding surfaces, locking means (4) extending through these holes to the basic member, the locking means comprising shanks (10), whose thicknesses (D2) in a direction transverse to the length of the holes are smaller than the hole diameters (D1), and clamping means (11) for pressing the support member into immobile contact with the basic member after the positioning has been completed, characterized in that in the positioning device, a layer of fatty lubricant (S1) is provided between the first sliding surface (7) and the second sliding surface (8), the layer generating a first friction (U1) between these sliding surfaces, that a bushing (20) and/or washers (22) or the like are provided between the clamping means (11) and the support member (6), these means generating a second friction (U2) between the clamping means and the support member, and that the first friction (U1) is substantially higher than the second friction (U2) to prevent the support member (6) from shifting relative to the basic member (5).

2. A positioning device as defined in claim 1, characterized in that the locking means (4) are: either screws (12) equipped with a functional head (14), whose female counter-threads (13) are located in the basic member (5); or screw rods unrotatably fastened in the basic member and nuts rotatable on these; or locking pins fastened to the basic member and eccentric means or the like rotatable at the ends of these, and that the bushing (20) is located between the functional head (14) and the nut or between the eccentric means and the outer surface (16) of the support member (6) respectively, the outer surface facing in a direction opposite to fie second sliding surface (8).

3. A positioning device as defined in claim 1, characterized in that it comprises, at each bushing (20), a press spring (21), whose first end (31) bears against the outer surface (16 or 17) of the support member or its recess and whose second end (32) bears against the stop face (23) of the bushing, the stop face opening in the same direction as the second sliding surface (8), and in that a spring (21) maintains a compression force (F2) forcing the first and the second sliding surface (7, 8) against one another.

4. A positioning device as defined in claim 1 or 3, characterized in that the low value of the said second friction (U2) is produced by:

the matching angular cross-sections of the unrotatable shank (10) of the locking means and the hole in the bushing (20) on this; and/or binding members (49) firmly connecting the mutually spaced bushings (20); and/or a grip produced by the friction (U3) between the first end (31) of the press spring and the support member (6), and accordingly, a friction (U4) between the second end (32) of the press spring and the stop face (23) of the bushing, and transmitted from the support member (6) to the bushing (20) by the press spring; and/or one or more washers (22) in the second contact area (A2) between the clamping means (11) and the second end (26) of the bushing, the material of the washers having been selected so as to generate a low friction coefficient ($\mu$2) between the material of the second end of the bushing and the clamping means, such as a functional head, a nut, eccentric means or the like; and/or by means of a lubricant (S2) with as low a friction (U2) as possible.

5. A positioning device as defined in claim 1, characterized in that the basic ingredient of the high-friction (U1) fatty lubricant (S1) is a natural, petroleum-based or synthetic oil, such a gelled oil, a macromolecular, natural, petroleum-based or synthetic fatty compound or a mixture of some of the components mentioned above, that the fatty lubricant may contain one or more solid lubricants as an additive, and that the fatty lubricant has a consistency such that the ASTM D 217 standard penetration value is in the range from 350 to 120, preferably in the range from 270 to 200.

6. A positioning device as defined in claim 1, characterized in that the press springs (21) are preferably longer than the distance between the outer surface (16 or 17) of the basic member or its recess and the stop face (23) of the bushing, the press spring acting as a compression spring, that the opposite ends (31, 32) of the press spring have been given an at least partly planar shape or any other surface which is almost symmetrical with the central line (28) of the spring.

7. A positioning device as defined in claim 1, characterized in that the first sliding surface (7) and/or the second sliding surface (8) have been provided, in the area of the pair of sliding surfaces, with one or more fat grooves (27) and the shanks (10) of the locking means and the directions of action of the force (F2) of the press springs (21) are substantially perpendicular to the pair of sliding surfaces (7, 8).

8. A positioning device as defined in claim 1, mounted such that the direction of the plane (T) of the pair of sliding surfaces (7, 8) diverges from the horizontal plane, characterized in that the device flier comprises anti-creep means (40) comprising a carrier spring (41) between the support member (6) and the basic member (5), the direction of action of the spring force of the carrier spring having a component (F3), whose value is maximally equal to the force (G1) generated by the weight of the support member and the associated devices and at least equal to this force, from which the frictional force of the sliding surfaces has been subtracted (G2 in total), but having an opposite direction.

9. A positioning device as defined in claim 8, characterized in that the direction of action of the force (F3) of the carrier spring (41) is parallel to the pair of sliding surfaces (7, 8), that the points of support (42, 43) of the carrier spring in the support member and/or the basic member have been designed with a shape allowing the carrier spring to be inclined transversely to its direction of action, at least one (42) of the points of support having preferably the shape of a cone or a wedge, and that the position cavity (44) of the carrier spring is greater than the outer dimensions of the spring.

10. A positioning device as defined in claim 1, characterized in that the support member (6) is provided with push-buttons (45) movable parallel to the pair of sliding surfaces (7, 8), each of the push-buttons bearing against the support member through a compensating spring (46) subject to initial tension, and that there are typically two pairs of push-buttons, each pair of buttons having opposite directions of motion and the directions of motion of the first pair of buttons being perpendicular to those of the second pair of buttons.

11. A positioning device as defined in claim 10, characterized in that the stiffness of the compensating springs (46) has been selected such that the force (F4) generated by the initial tension of the spring is smaller than the frictional force ($F\mu$) between the pair of sliding surfaces, the frictional force between the sliding surfaces being however exceeded before the compensating spring reaches the bottom, and that the compensating springs (46) are preferably press springs.

12. A positioning device as defined in claim 1, characterized in that the first and the second sliding surface (7, 8) have been designed with such exactly matching shapes that the pressure (P) of the ambient gaseous atmosphere maintains these sliding surfaces pressed against one another owing to the air-removing effect of the fatty lubricant (S1) after these sliding surfaces (7, 8) have been pressed together, and that the fatty lubricant has a specific dynamic friction coefficient which as far as possible remains equal to its static friction coefficient, at least with low speeds of movement.

13. A positioning device as defined in any of the preceding claims, characterized in that the said one straight line (3) between the components (1, 2) is the optical axis (53) or central line of an optical component (50) or similar (51), that the support member (6) has a through-hole (52) for each optical component (51) or its radiation (B) and that the pair of sliding surfaces (7, 8) and the locking means (4) surround this opening (52) symmetrically.

14. A positioning device as defined in claim 1, characterized in that the peripheral surface (48) of the support member (6) has been designed with a circular shape and asperities, and that the peripheral surface (38) of the functional head (14) or the nut has been designed with a circular shape and asperities.

* * * * *